(12) United States Patent
McGreer et al.

(10) Patent No.: US 6,603,916 B1
(45) Date of Patent: Aug. 5, 2003

(54) LIGHTWAVE CIRCUIT ASSEMBLY HAVING LOW DEFORMATION BALANCED SANDWICH SUBSTRATE

(75) Inventors: Kenneth McGreer, Fremont, CA (US);
Peter D. Ascanio, Fremont, CA (US);
Maria Guardado, San Jose, CA (US);
Randal E. Zugnoni, Dublin, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 22 days.

(21) Appl. No.: 09/915,990

(22) Filed: Jul. 26, 2001

(51) Int. Cl.[7] ................................................. G02B 6/10
(52) U.S. Cl. ......................... 385/129; 385/14; 385/130; 385/131; 385/132
(58) Field of Search ........................ 385/129–132, 385/14

(56) References Cited

U.S. PATENT DOCUMENTS

| | | | | |
|---|---|---|---|---|
| 4,878,957 A | | 11/1989 | Yamaguchi et al. ....... 148/33.3 |
| 4,889,401 A | * | 12/1989 | Klement et al. ............ 385/131 |
| 5,034,350 A | | 7/1991 | Marchisi ..................... 437/207 |
| 5,059,475 A | * | 10/1991 | Sun et al. .................... 428/195 |
| 5,071,785 A | | 12/1991 | Nakazato et al. ............. 437/62 |
| 5,366,933 A | | 11/1994 | Golwalkar et al. .......... 437/215 |
| 5,382,551 A | | 1/1995 | Thakur et al. ............... 437/247 |
| 5,545,922 A | | 8/1996 | Golwalker et al. .......... 257/676 |
| 5,801,072 A | | 9/1998 | Barber ......................... 438/107 |
| 5,801,084 A | | 9/1998 | Beasom et al. .............. 438/457 |
| 5,827,342 A | * | 10/1998 | Jean Beguin et al. ........ 65/60.5 |
| 6,072,243 A | | 6/2000 | Nakanishi .................... 257/783 |
| 6,121,689 A | | 9/2000 | Capote et al. ................ 257/783 |
| 6,133,067 A | | 10/2000 | Jeng et al. .................... 438/110 |
| 6,191,952 B1 | | 2/2001 | Jimarez et al. ............... 361/771 |
| 6,194,247 B1 | | 2/2001 | Burns et al. .................. 438/107 |
| 6,389,209 B1 | * | 5/2002 | Suhir ............................ 385/129 |
| 6,418,261 B1 | * | 7/2002 | Boek et al. ................... 385/129 |
| 6,477,308 B2 | * | 11/2002 | Hattori et al. ................ 385/129 |
| 6,501,895 B1 | * | 12/2002 | Bloechl et al. ............... 385/129 |
| 2003/0021567 A1 | * | 1/2003 | Yoneda ......................... 385/129 |

* cited by examiner

*Primary Examiner*—Brian Healy
*Assistant Examiner*—Daniel Petkovsek
(74) *Attorney, Agent, or Firm*—Amin & Turocy, LLP (57) ABSTRACT

A planar lightwave circuit assembly has an optical layer on a substrate. The substrate is attached to one face of a riser. A layer of a material having properties substantially the same as the substrate is attached to the other face of the riser. The layer of material counteracts the tendency of the assembly to bow as a result of differences in the coefficients of thermal expansion of the riser and substrate. This reduces stress-induced changes in performance characteristics of lightwave circuits in the optical layer.

30 Claims, 5 Drawing Sheets

LIGHTWAVE CIRCUIT ASSEMBLY HAVING LOW DEFORMATION BALANCED SANDWICH SUBSTRATE

TECHNICAL FIELD

This invention relates to planar lightwave circuits. The invention has particular application to silica on silicon type lightwave circuits. Such circuits are fabricated on a silicon substrate attached to a support plate (which is referred to herein as a "riser").

BACKGROUND

A typical planar lightwave circuit (PLC) comprises light guides, optical switches, optical gratings or other optical components formed in an optical layer on a substrate. The substrate typically comprises a silicon wafer. In silica on silicon technology, one or more layers of doped or undoped silica are deposited on a silicon substrate. The optical components are fashioned in the silica layers. The optical layer typically comprises at least three or more layers of silica including a bottom cladding layer, a core layer and a top cladding layer. Some types of PLC include silicon in the optical layer, as is the case with silicon-on-insulator (SOI) PLCs. Other alternative PLC constructions have optical layers based upon other materials. These include InP-based PLCs, GaAs-based PLCs and polymer based PLCs.

Not all PLCs that are manufactured are "good" in that they meet specified performance criteria. Typically a number of PLCs are fabricated on a silicon wafer. The as-manufactured PLCs are tested. PLCs which meet the specified performance criteria are selected for packaging.

PLCs are typically packaged in assemblies which include a riser on which the substrate is mounted. The riser provides a convenient base for mounting the PLC, mechanical support for the PLC and a way to maintain the PLC at a desired temperature. The riser is typically made from a thermally conductive material. Thermally conductive materials suitable for use in making risers include various metals. A typical metal suitable for making risers is CuW. A heater and temperature sensor may be attached to the riser for the purpose of maintaining the PLC at a desired operating temperature. The substrate is affixed to the riser with an adhesive, typically a thermally cured epoxy.

Differences in the coefficient of thermal expansion of the substrate and the riser can cause the PLC to become distorted. Typically the distortion is associated with a difference between the temperature at which the epoxy was cured and the temperature of the PLC during its operation. The distortion causes stresses in the optical components. Such stresses may alter the optical properties of the optical components. For example, a change in stress in the material which makes up an arrayed waveguide grating may alter the effective index and birefringence of the material. This can alter performance characteristics of the PLC including the center wavelength of the passbands of the arrayed waveguide grating. Since such performance characteristics may need to meet performance specifications for the PLC, variations in such performance characteristics from design values are highly undesirable. The degradation of the performance characteristics of the PLC is a direct result of the distortion. The stress-induced variations in performance can cause a PLC which met its performance specifications prior to packaging to fail after it has been packaged.

The extent to which a PLC will be distorted depends upon a large number of factors including the temperature at which the adhesive used to attach the substrate to the riser is cured and the thickness, stiffness and coefficient of thermal expansion of each relevant layer. These layers include the substrate, the riser, the adhesive and, to a smaller degree, the optical layer. The values of each of these parameters will vary somewhat between different PLCs due to manufacturing variations. As a result of such manufacturing variations, the effect of stress on the operational characteristics of a PLC are difficult to predict to the desired degree of accuracy So far, there have been attempts to address this problem by using low modulus adhesives to join the substrate and riser. While such adhesives do reduce the amount of distortion and, may consequently reduce stress-induced changes in the performance characteristics of PLCs, they do not eliminate the problem. Furthermore, such low modulus adhesives may have other undesirable characteristics.

There remains a need for a way to avoid the degradation in performance caused by thermally induced distortions of PLCs.

SUMMARY OF THE INVENTION

This invention provides lightwave circuit assemblies comprising a riser, a substrate on a first face of the riser and a lightwave circuit on the substrate. Lightwave circuit assemblies according to the invention have a layer of material on a second face of the riser. The layer of material counters thermally induced distortions of the riser.

Accordingly, a first aspect of the invention provides a planar lightwave circuit assembly comprising: a riser, a substrate affixed to a first face of the riser, an optical layer comprising a lightwave circuit on the substrate and, a layer of material affixed to a second face of the riser. The second face is opposed to the first face. The riser has a first coefficient of thermal expansion, The substrate has a second coefficient of thermal expansion different from the first coefficient of thermal expansion and the layer of material has a third coefficient of thermal expansion different from the first coefficient of thermal expansion. The second and third coefficients of expansion may be the same. The second and third coefficients of thermal expansion are either both greater than the first coefficient of thermal expansion or both less than the first coefficient of thermal expansion. In preferred embodiments of the invention the layer of material has a coefficient of thermal expansion substantially the same as the coefficient of thermal expansion of the substrate. Most preferably the layer of material and the substrate each comprise the same material, and the layer of material and the substrate have substantially equal thicknesses. The layer of material and the substrate may advantageously each comprise a silicon layer.

Preferably the substrate and layer of material are each attached to the riser with a layer of a thermally activated epoxy. The layers of thermally activated epoxy attaching the substrate and layer of material to the riser are preferably substantially equal in thickness.

The planar lightwave circuit assembly may comprise a heater and/or temperature sensor in thermal connection with the riser. Preferably one of the faces of the riser has a first cut away portion to accommodate a heater or temperature sensor and the other one of the faces has a corresponding second cut away portion. There may be multiple pairs of corresponding cut away portions on the faces of the riser.

Another aspect of the invention provides a planar lightwave circuit assembly comprising: a riser; a substrate having a coefficient of thermal expansion; an optical layer comprising a lightwave circuit on the substrate; first adhesive means for affixing the substrate to the riser; a layer of material having a coefficient of thermal expansion substantially the same as the coefficient of thermal expansion of the substrate; and, second adhesive means for affixing the layer of material to the riser. Preferably the substrate covers a first region on a first face of the riser and the layer of material covers a second region substantially coextensive with the first region on a second face of the riser.

The planar lightwave circuit assembly preferably comprises thermal regulation means for maintaining the planar lightwave circuit assembly at an operating temperature. The optical layer may comprise a plurality of layers of silica and the substrate may comprise a silicon layer. In currently preferred embodiments of the invention, the layer of material and the substrate each comprise a silicon layer and, the layer of material and the substrate have substantially equal thicknesses.

The first and second adhesive means preferably respectively comprise first and second layers of a thermally activated epoxy which are substantially equal in thickness.

A planar lightwave circuit assembly according to the invention preferably includes mounting means for mounting the planar lightwave circuit to a submount. The mounting means may comprise mounting portions of the riser, the mounting portions projecting outwardly past edges of the substrate and layer of material.

Further features and advantages of the invention are described in the following detailed description of the invention and the drawings.

BRIEF DESCRIPTION OF DRAWINGS

In drawings which illustrate embodiments of the invention.

DESCRIPTION

The following description presents specific details of currently preferred embodiments of the invention in order to provide a more thorough understanding of the invention. It should be understood that the description of these preferred embodiments are merely illustrative and that they should not be taken in a limiting sense. Other embodiments of the invention may differ in such specific details. Some well known elements are not shown or described in detail to avoid unnecessarily obscuring the invention. Accordingly, the specification and drawings are to be regarded in an illustrative, rather than a restrictive, sense. The following detailed description is of the best modes presently contemplated by the inventors for practicing the invention.

Prior Art

Figure 1:
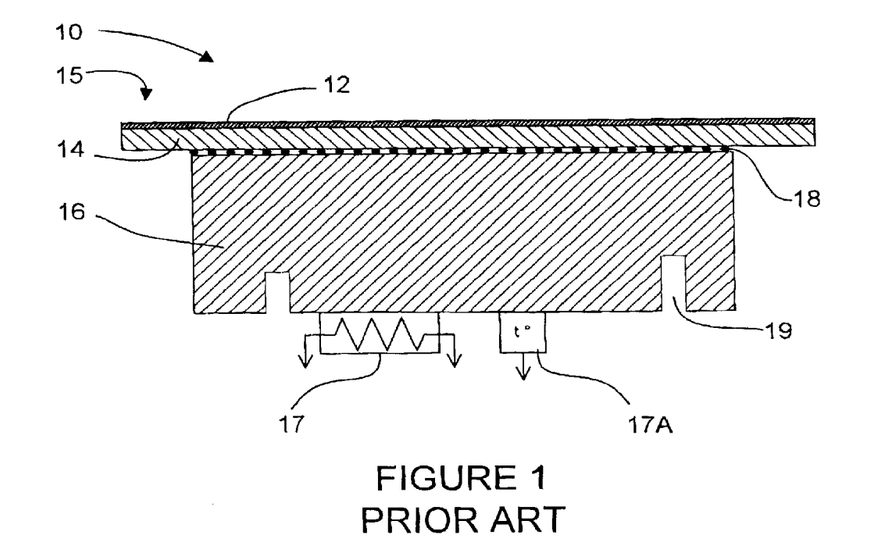
FIG. 1 is a schematic cross sectional view of a prior art planar lightwave circuit.

FIG. 1 shows a typical prior art planar lightwave circuit ("PLC") assembly 10. PLC assembly 10 comprises an optical layer 12 on a silicon substrate 14. Optical layer 12 is patterned to provide various interconnected optical devices and pathways (not shown). Optical layer 12 typically is quite thin, often on the order of 20 $\mu$m to about 80 $\mu$m. Therefore, optical layer 12 does not have a large effect on the mechanical properties of PLC assembly 10. Optical layer 12 is tested to verify that it meets performance specifications.

After optical layer 12 is tested, substrate 14 is affixed to a riser 16 with a layer of adhesive 18. Adhesive 18 typically comprises a thermally activated epoxy. Adhesive 18 is typically an adhesive of the type known as "die attach" adhesive which is compatible with both substrate 14 and riser 16. Riser 16 typically has dimensions on the order of about 4 cm×4 cm×0.15 cm. Holes 19 may be provided in riser 16 to mount PLC assembly 10.

Substrate 14 projects past the edge of riser 16 on at least one edge 15 to permit the ready attachment of fiber optic light guides to convey optical signals to and from selected points on optical layer 12. A heater 17 and a temperature sensor 17A are in thermal contact with riser 16 and permit the temperature of PLC assembly 10 to be maintained at a desired operating temperature.

PLC assembly 10 is typically packaged inside an enclosure (not shown). The enclosure may include a sub-mount. Riser 16 is attached to the sub-mount in any suitable way (for example by means of screws in holes 19) and the enclosure is sealed to protect PLC assembly 10. PLC assembly 10 may also be packaged in other ways.

Riser 16 and substrate 14 are typically flat when they are joined together. Riser 16 and substrate 14 generally have different coefficients of thermal expansion. Thus, when the temperature of PLC 10 departs from the temperature at which riser 16 and substrate 14 were fastened together, PLC 10 becomes bowed. Often substrate 14 is affixed to riser 14 at a temperature, which is higher than the operating temperature for PLC 10. The temperature may be determined by the type of adhesive 18 used to affix substrate 14 to riser 16. The curing temperatures of typical thermally activated epoxies are in the range of about 80° C. to about 120° C., or higher. Since substrate 14 is firmly bonded to riser 16 by adhesive layer 18, differential thermal contraction of substrate 14 and riser 16 causes PLC 10 to become bowed or warped. This stresses the optical layer 12.

Figure 2:
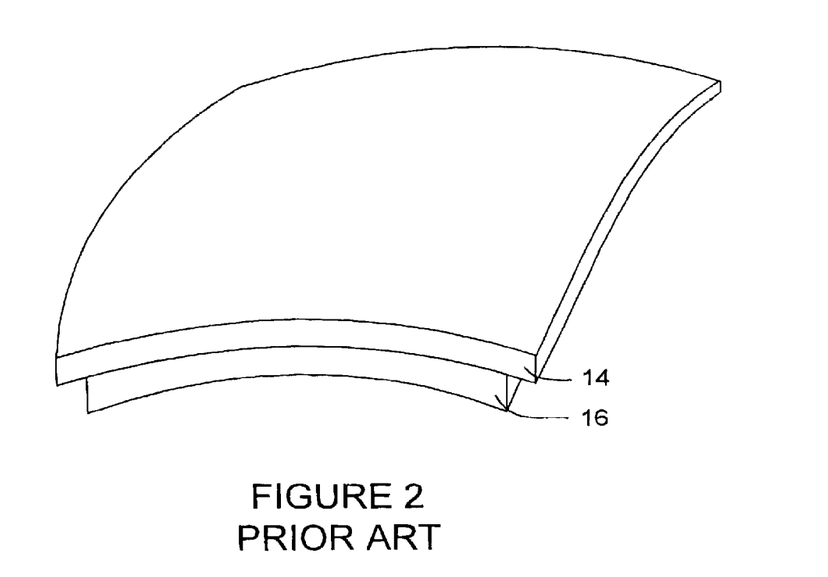
FIG. 2 is an exaggerated drawing showing bowing of the prior art planar lightwave circuit which can occur with changes in the temperature of the circuit.
Figure 5A:
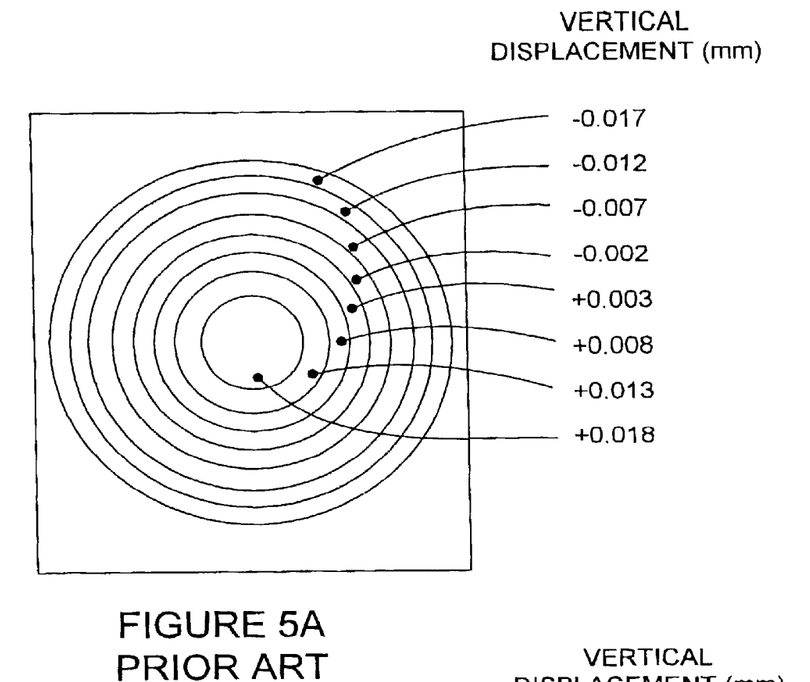
FIGS. 5A and 5B are maps respectively illustrating deviations from planarity of a prior art lightwave circuit and a similar lightwave circuit made according to this invention; and, FIG. 6 is a top plan view of a lightwave circuit assembly according to the invention in which the substrate is not rectangular.

Typically the coefficient of thermal expansion of riser 16 is greater than that of substrate 14. For example, riser 16 may be fabricated from CuW which has a coefficient of thermal expansion between $5 \times 10^{-6}$/° C. and $7 \times 10^{-6}$/° C. while substrate 14 may comprise silicon which has a coefficient of thermal expansion of approximately $2.7 \times 10^{-6}$/° C. As PLC 10 is cooled from its fabrication temperature to its operating temperature (typically between 60° C. and 80° C.) riser 16 contracts more than substrate 14 to produce a bow as shown in FIGS. 2 and 5A.

As PLC assembly 10 bows, the material of optical layer 12 is stressed. Since optical layer 12 is typically far from the neutral axis of PLC assembly 10, optical layer 12 can become highly stressed. This affects its optical properties and, consequently, alters the performance characteristics of the lightwave circuits in optical layer 12. The degradation in performance of the lightwave circuits in optical layer 12 may be significant.

This Invention

Figure 3A:
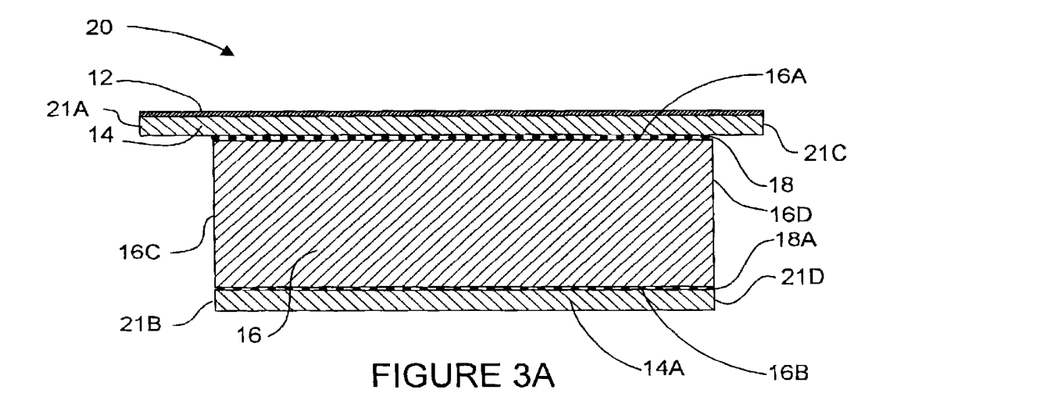
FIGS. 3A and 3B are schematic cross sectional views of a planar lightwave circuit according to this invention.
Figure 3B:
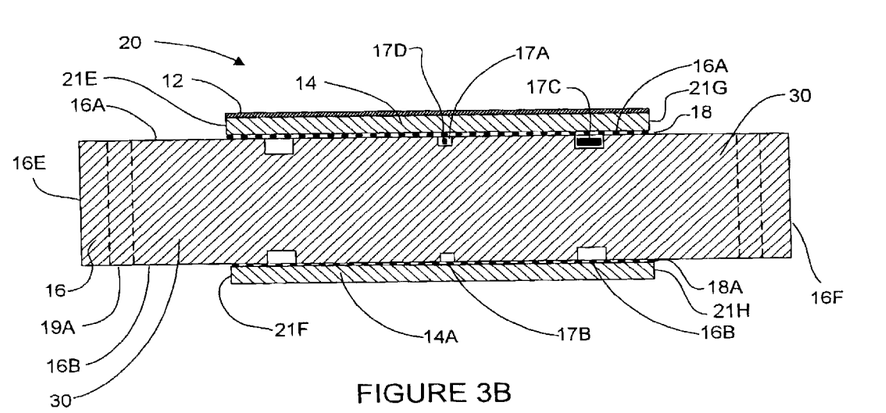
Figure 4A:
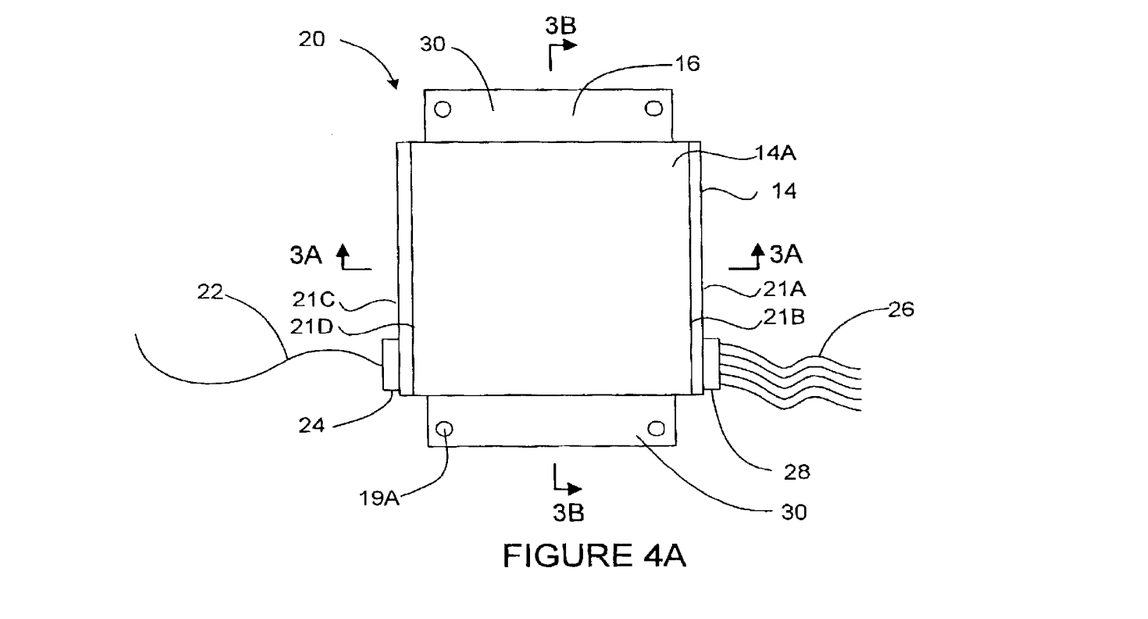
FIGS. 4A and 4B are respectively a bottom plan view and a top plan view of a planar lightwave circuit according to this invention.
Figure 4B:
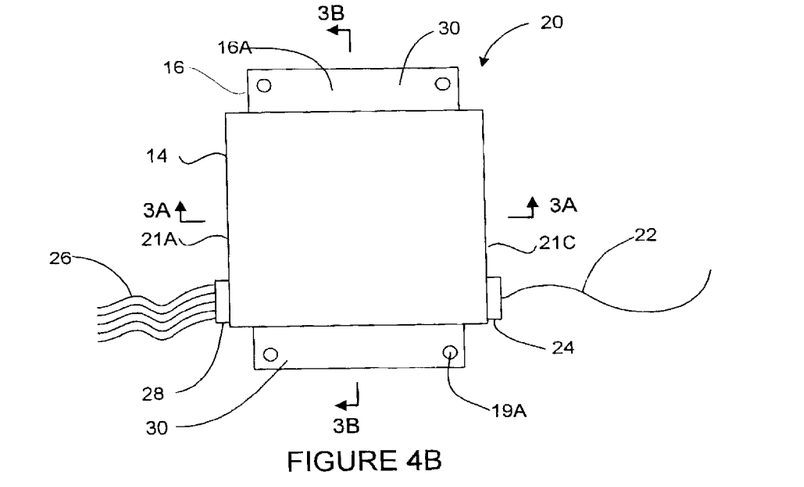

In the description of this invention, like reference numerals are used to refer to structures which are described above in relation to the prior art. For conciseness, the full descriptions of such structures are not repeated below. FIGS. 3A, 3B and 4 show a PLC assembly 20 according to an embodiment of this invention. Assembly 20 comprises a riser 16. Riser 16 is made of a material having a first coefficient of thermal expansion. For example, riser 16 may be made of CuW.

A substrate 14 bearing an optical layer 12 is mounted to a first face 16A of riser 16. Substrate 14 is made from a material having a second coefficient of thermal expansion different from the first coefficient of thermal expansion. In a preferred embodiment, substrate 14 comprises silicon. Alternative substrate materials include glass, InP and GaAs. Where substrate 14 comprises a layer of silicon it may comprise an oxide layer on its side toward riser 16. A first layer 18 of a suitable adhesive bonds substrate 14 to riser 16. This first layer of adhesive is one example of a first adhesive means for affixing the substrate to the riser.

PLC assembly 20 also has a layer 14A of material mounted to a second face 16B of riser 16 with a second layer 18A of adhesive. This second layer of adhesive is one example of a second adhesive means for affixing the substrate to the riser. The material of layer 14A has a third coefficient of thermal expansion which is different from the first coefficient of thermal expansion (but may be the same as the second coefficient of thermal expansion).

The second and third coefficients of thermal expansion should be either both greater than the first coefficient of thermal expansion or both less than the first coefficient of thermal expansion. In a preferred embodiment the second and third coefficients of thermal expansion are substantially equal to one another. Preferably the material of layer 14A is the same as the material of substrate 14 and layer 14A has a thickness the same as that of substrate 14. For, example, if substrate 14 comprises a layer of silicon 0.675 mm thick (substrate 14 is commonly 0.675 mm in thickness and is typically in the range of about 0.25 mm in thickness to about 1 mm in thickness) then layer 14A should also comprise a layer of silicon 0.675 mm thick.

Preferably the adhesive of layer 18A is the same as the adhesive of layer 18 and the thicknesses of first and second adhesive layers 18A and 18B are the same. Layers 18 and 18A are preferably of a suitable thermally cured epoxy material and may comprise die attach adhesives compatible with riser 16, substrate 14 and layer 14A.

In general, where substrate 14 covers a first area on first face 16A of riser 16 then layer 14 should cover a corresponding second area on second face 16B. The first and second areas are opposed to one another. Material 14A preferably extends substantially to the edges of riser 16 in any locations where substrate 14 projects past the edge of riser 16. This situation is shown in FIG. 3A wherein edges 21A and 21C of substrate 14 are depicted as projecting past edges 16C and 16D respectively of riser 16. Edges 21B and 21D of layer 14 extend to the edges 16C and 16D of riser 16.

To illustrate the effectiveness of this invention, comparative numerical simulation estimates of curvature have been made for one specific embodiment of the invention. In this embodiment, riser 16 has thickness of 0.060 inches, a width of 1.74 inches, and a length of 1.80 inches. The simulation includes data for substrates 14 and layers 14A which each have a thickness in the range of 0.650 mm to 0.700 mm. The data indicates that a prior art assembly (without a layer 14A) would have a curvature of 0.00015/mm. In this context, the value of curvature is taken to be a positive value regardless of the direction of the curvature. The assembly can be said to remain substantially flat if it has a curvature is less than 1/10 of that predicted for the unbalanced prior art construction described above (in this case an assembly having a curvature of 0.000015/mm or less would be considered to be substantially flat).

Within this context, when one of substrate 14 and layer 14A has a thickness of 0.650 mm and the other has a thickness of 0.700 mm, the thickness values may be considered to be substantially equal since the simulations predict that PLC assemblies made with these thickness values should be substantially flat. The simulation included die attach material as an adhesive layer 18 between substrate 14 and riser 16 and die attach material as an adhesive layer 18A between the layer 14A and riser 16. Each of these layers had a thickness in the range from 0.0030 inches to 0.0060 inches. In this context, when one of layers 18 and 18A has a thickness of 0.0030 inches and the other one of layers 18 and 18A has a thickness of 0.0060 inches, the thickness values may be considered to be substantially equal since the simulations predict that PLC assemblies made with these thickness values should be substantially flat. In a Monte Carlo simulation with 500 samples, 95% of the samples had curvatures less than 0.000015/mm, (i.e., the curvature, in 95% of the cases, was reduced by more than at least a factor of 10 from that predicted for the prior art PLC assembly) provided that the thickness values of the die attach materials are not different by more than about 0.003 inches and the chip and the bottom material have thickness values that are not different by more than about 0.05 mm. Hence, within this context, the substrate 14 and layer 14A may be different in thickness by 0.05 mm and still be regarded as having substantially the same thickness since the resulting structure is still substantially flat.

As shown in FIG. 4, the illustrated PLC assembly 20 has an optical fiber 22 connected to optical layer 12 at a first junction 24 and a ribbon 26 of optical fibers connected to optical layer 12 at a second junction 28. PLC assembly 20 may be designed for connection to any reasonable number of optical fibers. To facilitate these connections substrate 14 projects past the edge of riser 16. On edges of PLC assembly 20 to which optical connections are made material 14A preferably does not project past the edges of riser 16 as far as substrate 14 and most preferably does not project significantly past the edges of riser 16. This prevents material 14A from interfering with the optical connections.

As shown in FIGS. 4 and 3B, riser 16 preferably has mounting portions 30 which project past edges of substrate 14 and material 14A. Mounting portions 30 may be used to attach PLC assembly 20 to a sub-mount by, for example, applying suitable fasteners to mounting holes 19A, affixing mounting portions 30 to a sub-mount with an adhesive (such as a suitable epoxy) or clamping mounting portions 30 in suitable mechanical clamps. In some cases the riser may not have mounting portions projecting past edges of substrate 14 and material 14A. In such cases other means may be used for attaching the PLC assembly 20 to a submount or other mounting. For example, an adhesive material may be used to attach PLC assembly 20 to a submount. The means of attaching the PLC assembly 20 to a submount (or other mounting structure) should permit some relative motion of the submount and PLC assembly 20 to accommodate differences in coefficients of thermal expansion between the submount and PLC assembly 20. Preferably, the edges of substrate 14 and material 14A are substantially opposed to one another in their portions along the inner edges of mounting portions 30. This situation is shown in FIG. 3B which depicts edge 21E of substrate 14 located inwardly from edge 16E of riser 16 on the inner side of mounting portion 30. Edge 21F is directly opposed to edge 21E (i.e., in the illustrated view, edge 21F is vertically aligned with edge 21E but on the opposite side of riser 16). Edges 21G and 21H are also directly opposed to one another and are recessed from edge 16F of substrate 16 to define another mounting portion 30. Mounting portions 30 constitute an example of mounting means for mounting the planar lightwave circuit to a sub-mount.

Riser 16 may be cut away to accommodate one or more heaters and one or more temperature sensors. This may be done, for example, by providing grooves 17A in face 16A of riser 16. If this is done then corresponding grooves 17B should also be provided in face 16B so that assembly 20 remains bilaterally symmetrical. The heaters and temperature sensors may be used to control the temperature of PLC assembly 20 at an operating temperature. FIG. 3B shows schematically a heater 17C and a temperature sensor 17D. As is known to those skilled in the art, heaters 17C and temperature sensor 17D are located so as to facilitate heating PLC assembly 20, and optical layer 12 in particular, to an operating temperature and maintaining optical layer 12 substantially uniform in temperature. The heater(s) and temperature sensor(s) together with a suitable controller constitute a thermal regulation means for maintaining the planar lightwave circuit assembly at an operating temperature. Riser 16 may also, or in the alternative, have internal bores to receive heaters and/or temperature sensors. Such internal bores should also be symmetrically disposed in riser 16.

Figure 5B:
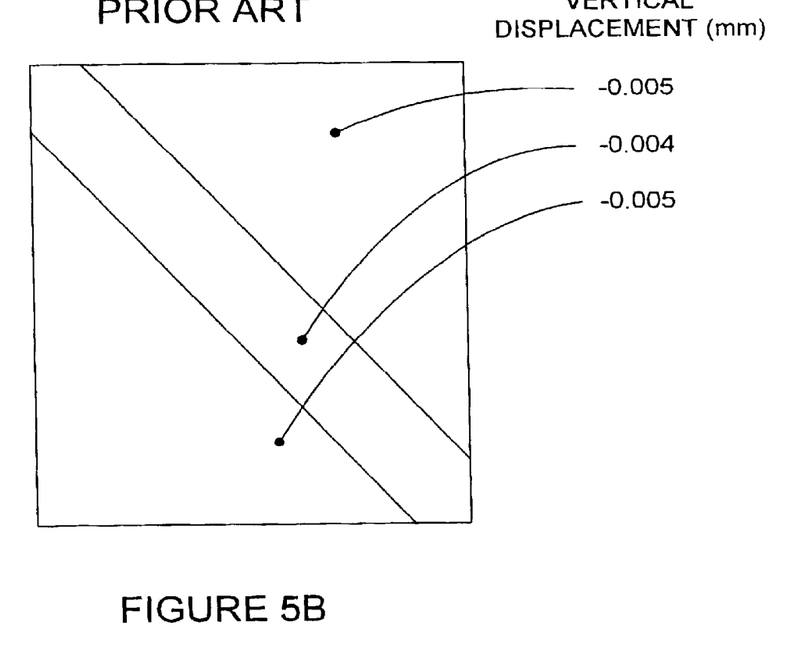

It can be appreciated that the structure of PLC assembly 20 which includes layers 18A and 14A on opposed faces of riser 16 provides a balanced structure. PLC assembly 20 tends not to become distorted with changes in temperature because the tendency of substrate 14 and riser 16 to cause PLC assembly to become bowed in one direction is counteracted by the tendency of material 14A and riser 16 to cause PLC assembly 20 to become bowed in the opposite direction. This is illustrated by FIGS. 5A and 5B which compare the calculated distortion of a prior art PLC assembly to that of a PLC assembly according to this invention under the same conditions. It can be seen that the PLC assembly according to this invention remains substantially flat while the prior art PLC acquires a substantial bow.

This invention reduces the effects of manufacturing variations on the performance characteristics of PLC assemblies. The invention can also increase yields of good PLC assemblies since the PLC assembly of the invention has much less effect on the performance of lightwave circuits in optical layer 12 than do prior PLC assemblies. Lightwave circuits which test good before being assembled into PLC assemblies according to this invention are likely to still test good after assembly.

As will be apparent to those skilled in the art in the light of the foregoing disclosure, many alterations and modifications are possible in the practice of this invention without departing from the spirit or scope thereof. The preferred embodiments of the invention described above and shown in the drawings may be altered in ways which are obvious in light of the enclosed disclosure and the knowledge of those skilled in the art. For example:

the material of layer 14A is not necessarily the same material as substrate 14. A material which has a similar properties including, especially, a coefficient of thermal expansion and an elastic constant closely similar to that of substrate 14 could be used instead.

Substrate 14 and layer 14A could comprise different materials having different thicknesses, thermal expansion coefficients and elastic constants as long as layer 14A and substrate 14 are have thicknesses, thermal expansion coefficints, and elastic constants such that the assembly remains relatively flat as the temperature is changed.

Figure 6:
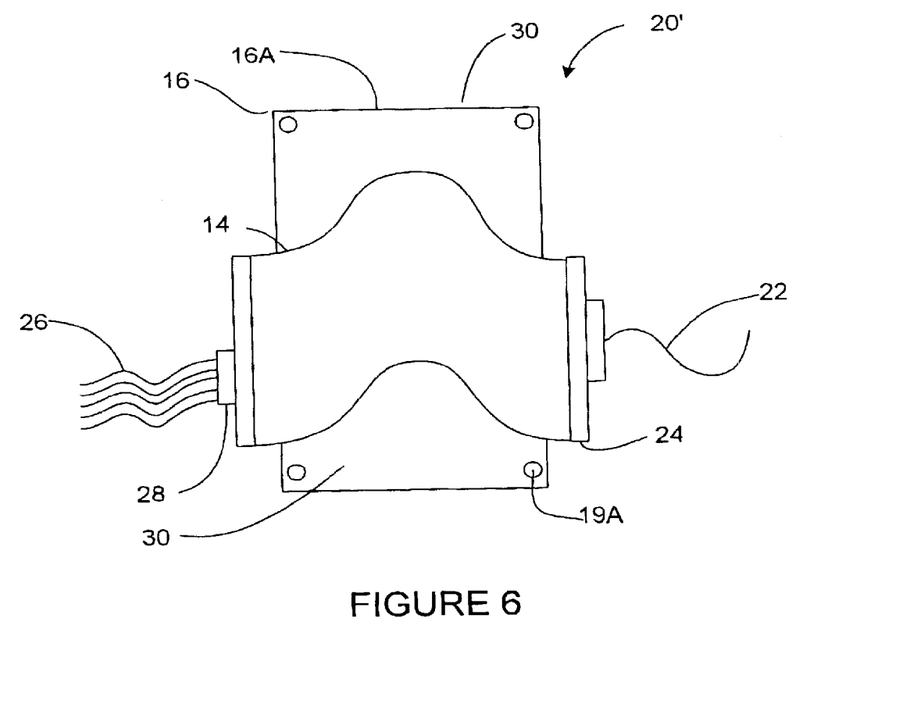

Substrate 14 does not need to be rectangular. Substrate 14 could have other shapes. For example, FIG. 6 shows a lightwave circuit assembly 20' wherein substrate 14 is not rectangular.

Where a component (e.g. an assembly, device, circuit, layer etc.) is referred to above, unless otherwise indicated, reference to that component (including a reference to a "means") should be interpreted as a reference to any component which performs the function of the described component (i.e., that is functionally equivalent), including components which are not structurally equivalent to the disclosed structure which performs the function in the illustrated exemplary embodiments of the invention. Accordingly, the scope of the invention is to be construed in accordance with the substance defined by the following claims.

What is claimed is:

1. A planar lightwave circuit assembly comprising:
   a riser having a first coefficient of thermal expansion;
   a substrate affixed to a first face of the riser, the substrate having a second coefficient of thermal expansion different from the first coefficient of thermal expansion;
   an optical layer comprising a lightwave circuit on the substrate; and,
   a layer of material affixed to a second face of the riser opposed to the first face, the layer of material having a third coefficient of thermal expansion different from the first coefficient of thermal expansion;
   wherein the second and third coefficients of thermal expansion are either both greater than the first coefficient of thermal expansion or both less than the first coefficient of thermal expansion, and the third coefficient of thermal expansion is between the first and second coefficients of thermal expansion, and
   the layer of material is at least one of thicker than the substrate and stiffer than the substrate.

2. The planar lightwave circuit assembly of claim 1 wherein the layer of material has a coefficient of thermal expansion substantially the same as the coefficient of thermal expansion of the substrate.

3. The planar lightwave circuit assembly of claim 2 wherein the layer of material and the substrate each comprise the same material.

4. The planar lightwave circuit assembly of claim 3 wherein the layer of material and the substrate have substantially equal thicknesses.

5. The planar lightwave circuit assembly of claim 4 wherein the layer of material and the substrate each comprise a silicon layer.

6. The planar lightwave circuit assembly of claim 5 wherein the riser comprises a metal plate.

7. The planar lightwave circuit assembly of claim 6 wherein the riser has a thickness in the range of 1 mm to 4 mm.

8. The planar lightwave circuit assembly of claim 1 wherein the layer of material is thicker than the substrate.

9. The planar lightwave circuit assembly of claim 1 wherein the layer of material is stiffer than the substrate.

10. The planar lightwave circuit assembly of claim 1 comprising a first layer of a thermally activated epoxy between the substrate and the riser.

11. The planar lightwave circuit assembly of claim 10 comprising a second layer of a thermally activated epoxy between the layer of material and the riser.

12. The planar lightwave circuit assembly of claim 11 wherein the first and second layers of thermally activated epoxy are substantially equal in thickness.

13. The planar lightwave circuit assembly of claim 12 wherein the layer of material and the substrate each comprise a silicon layer, the layer of material and the substrate have substantially equal thicknesses, and the riser comprises a metal plate.

14. The planar lightwave circuit assembly of claim 1 wherein the riser comprises at least one mounting portion, the mounting portion projecting outwardly past an edge of the substrate, wherein the edge of the substrate and a corresponding edge of the layer of material are substantially coextensive along an inner side of the mounting portion.

15. The planar lightwave circuit assembly of claim 14 wherein the layer of material and the substrate each comprise a silicon layer, the layer of material and the substrate have substantially equal thicknesses, and the riser comprises a metal plate.

16. The planar lightwave circuit assembly of claim 1 wherein one of the faces of the riser has a first cut away portion to accommodate a heater or temperature sensor and the other one of the faces has a corresponding second cut away portion.

17. The planar lightwave circuit assembly of claim 16 comprising a heater located in the first cut away portion.

18. The planar lightwave circuit assembly of claim 16 wherein the cut away portion comprises a groove.

19. The planar lightwave circuit assembly of claim 16 wherein the riser comprises at least one mounting portion, the mounting portion projecting outwardly past an edge of the substrate, wherein the edge of the substrate and a corresponding edge of the layer of material are substantially coextensive along an inner side of the mounting portion.

20. The planar lightwave circuit assembly of claim 16 comprising a first layer of a thermally activated epoxy between the substrate and the riser, a second layer of a thermally activated epoxy between the layer of material and the riser wherein the first and second layers of thermally activated epoxy are substantially equal in thickness.

21. The planar lightwave circuit assembly of claim 16 wherein the layer of material and the substrate each comprise a silicon layer, the layer of material and the substrate have substantially equal thicknesses, and the riser comprises a metal plate.

22. The planar lightwave circuit assembly of claim 1 wherein the substrate covers a first area on the first face of the riser and the layer of material covers a corresponding second area, the second area being directly opposed to the first area on the second face of the riser.

23. A planar lightwave circuit assembly comprising:

a riser;

a substrate having a coefficient of thermal expansion;

an optical layer comprising a lightwave circuit on the substrate;

first adhesive means for affixing the substrate to the riser;

a layer of material having a coefficient of thermal expansion substantially the same as the coefficient of thermal expansion of the substrate; and, second adhesive means for affixing the layer of material to the riser.

24. The planar lightwave circuit assembly of claim 23 wherein the substrate covers a first region on a first face of the riser and the layer of material covers a second region substantially coextensive with the first region on a second face of the riser.

25. The planar lightwave circuit assembly of claim 24 comprising thermal regulation means for maintaining the planar lightwave circuit assembly at an operating temperature.

26. The planar lightwave circuit assembly of claim 24 wherein the optical layer comprises a plurality of layers of silica and the substrate comprises a silicon layer.

27. The planar lightwave circuit assembly of claim 24 wherein the layer of material and the substrate each comprise a silicon layer and, the layer of material and the substrate have substantially equal thicknesses.

28. The planar lightwave circuit assembly of claim 27 wherein the first and second adhesive means respectively comprise first and second layers of a thermally activated epoxy and the first and second layers are substantially equal in thickness.

29. The planar lightwave circuit assembly of claim 23 comprising mounting means for mounting the planar lightwave circuit to a submount.

30. The planar lightwave circuit assembly of claim 29 wherein the mounting means comprise mounting portions of the riser, the mounting portions projecting outwardly past edges of the substrate and layer of material.

* * * * *